Dec. 18, 1928.

M. SANDFIELD 1,695,862

SLOT INSULATING CELL

Filed Sept. 16, 1926

WITNESSES:
C. J. Weller.
O. B. Buchanan

INVENTOR
Michael Sandfield
BY
ATTORNEY

Patented Dec. 18, 1928.

1,695,862

UNITED STATES PATENT OFFICE.

MICHAEL SANDFIELD, OF PITTSBURGH, PENNSYLVANIA, ASSIGNOR TO WESTINGHOUSE ELECTRIC & MANUFACTURING COMPANY, A CORPORATION OF PENNSYLVANIA.

SLOT INSULATING CELL.

Application filed September 16, 1926. Serial No. 135,839.

My invention relates to insulating structures and it has particular relation to the slot lining cells for the slotted cores of dynamo-electric machines.
An object of my invention is to provide a slot cell of improved characteristics for partially closed slots.

The cell is so designed as to have a re-enforcing bend or fold at each end for preventing tearing of the corners of the slot cell when the conductor wires are pressed into place. At the same time, the re-enforcing folds are so designed that they do not cause the insulating cells to bulge out, but on the contrary, draw them into snug engagement with the sides of the conductors.

My construction is also such that perforations, and therefore leakage paths, in the insulation, are avoided, in contradistinction to certain practices of the prior art wherein a tape or binder has been sewed over each end of the slot cell and wherein the needle holes have very much weakened the insulating qualities of the surface leakage path between the coils and the frame of the machine.

My invention will best be understood by reference to the accompanying drawing, wherein Figure 1 is an end elevation of a partially assembled stator member of a dynamo-electric machine embodying my invention;

Figure 1:
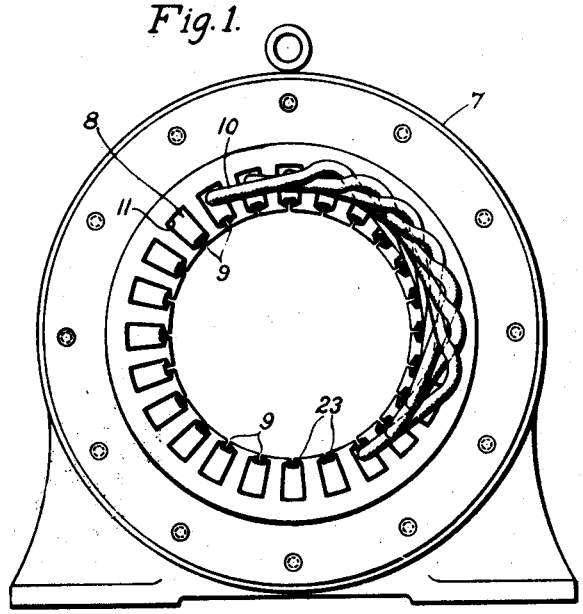

The problems and methods of winding partially closed-slot machines are described and illustrated in my article on "Winding induction motors" which appeared in the "Electric Journal" for December, 1923. With a general reference to this article for a more detailed description of the general features of the art of winding dynamo-electric machines, I shall confine my present description to the novel features of my slot insulating cell per se.
In Fig. 1, my invention is shown as applied to a stator member 7 having partially closed slots 8 which are provided with narrow openings 9, whereby the wires of the previously formed coils 10 may be individually pushed into the slots.

Figure 2:
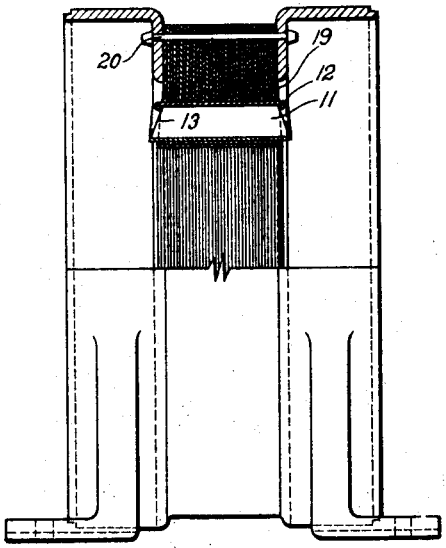
Fig. 2 is a longitudinal sectional view of the same, with the windings removed.

Before the coils are placed in the slots, the latter are lined with slot lining cells 11 which are accurately shaped to fit the slots and are of suitable insulating materials, made preferably of a combination of treated cloth and fish paper cemented together, the cloth supplying the insulating qualities, while the fish paper furnishes the desired mechanical strength. When the coils 10 have all been inserted in place and the individual turns of the coils are pressed into position, it occasionally happens that the slot lining cells will tear at the bottom corners, since the cells must extend beyond the ends of the core member, as indicated at 12 in Fig. 2, in order to provide a suitable insulating leakage path between the coils and the frame of the machine.

A most effective method of overcoming the tearing just mentioned, without entailing a bulky construction and without necessitating the perforation of the material of the lining cell, as by sewing, is to provide inturned flaps or folds 13 at the ends of each slot, the bends being arranged to be widest at the bottom of the cell and tapering off along the side edges of the cell.

Figure 3:
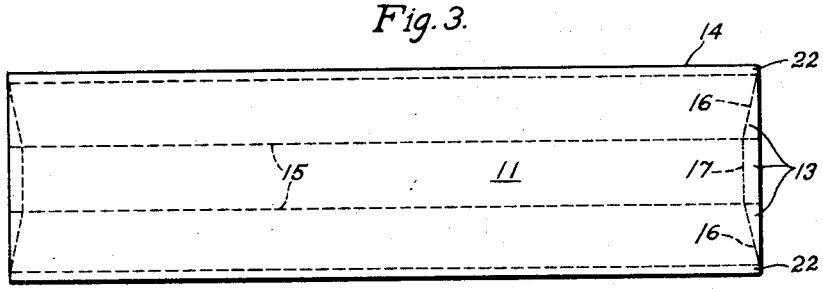
Fig. 3 is a plan view of the blank from which an insulating cell is formed.
Figure 4:
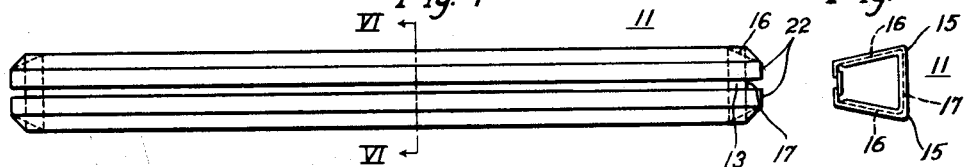
Figs. 4, 5 and 6 are plan, end and cross-sectional views of a completed slot lining cell.
Figure 5:
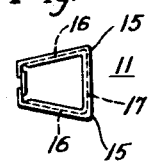
Figure 6:
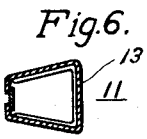

In Fig. 3, I have shown a blank 14 from which one of my slot lining cells 11 is made. The blank is of rectangular shape and is provided with two longitudinal bends 15 to form the bottom of the slot, as indicated by dotted lines in Fig. 3. The end flaps 13 are formed by providing inclined bends 16 in the ends of the side walls of the cell and a transverse bend 17 in the bottom wall, as is clearly indicated in Fig. 3. In practice, the cell lining material may be cut into shape and bent along the dotted lines 15, 16 and 17, all in one operation.

It will be observed that the inclined bends 16 in the side walls of the projecting ends of the slot cell are for the double purpose of fitting the cell to the shape of the slot, which is narrower at the top than at the bottom, and also to cause the bottom flap of the inturned fold 13 to tend to lie slightly spaced from the bottom of the cell, so that when the wires are pressed into place, the bottom flaps are drawn down against the bottoms of the cells, thus causing the flaps to draw inwardly at the sides and causing the lining cell to closely embrace the sides of the wires.

An additional advantage of the inclined flap of the inwardly bent ends 13 is that there is a certain amount of flaring of the laminations 19 of the core member, (shown in Fig. 2) as permitted by the standardization rules of the American Institute of Electrical Engineers, resulting from the fact that the laminations are tightly squeezed together at points removed from the slotted periphery, as indicated by the bolt 20. It will be noted that the inclination of the end of my folded slot cell is in the proper direction to correspond to the outward flare of the core laminations 19.

In the form of construction shown in the drawing, the cell 11 has lips 22 which insulate the wires from the slot-closing wedge 23 in the top of the slot.

My invention is, however, obviously applicable to either a lipped cell or one having no lips at the top of the slot.

I claim as my invention:

1. A slot cell comprising a rectangular sheet of insulating material having two longitudinal bends forming the bottom of the cell and having end bends forming inwardly bent flaps which are wider at the bottom than at the tops.

2. The combination with a dynamo-electric machine comprising a slotted core member, of a slot cell comprising insulating bottom and side walls extending beyond the ends of each of the slots, the ends of each slot cell being inturned to provide an overlapping flap which is smallest near the tops of the side walls and largest at the bottom wall of the cell, and a winding disposed in said slot cells.

3. The combination with a dynamo-electric machine comprising a core member having partially closed slots, of a slot cell comprising insulating bottom and side walls for each slot and a winding disposed in said slot cells, each slot cell having continuous, unperforated extensions projecting beyond the ends of the core member and having inwardly bent flaps of such configuration as to cause the same to cling closely to the sides of the conductors lying in the slot.

In testimony whereof, I have hereunto subscribed my name this 8th day of September, 1926.

MICHAEL SANDFIELD.